INVENTOR.
CARL A. RIETZ
BY
ATTORNEYS

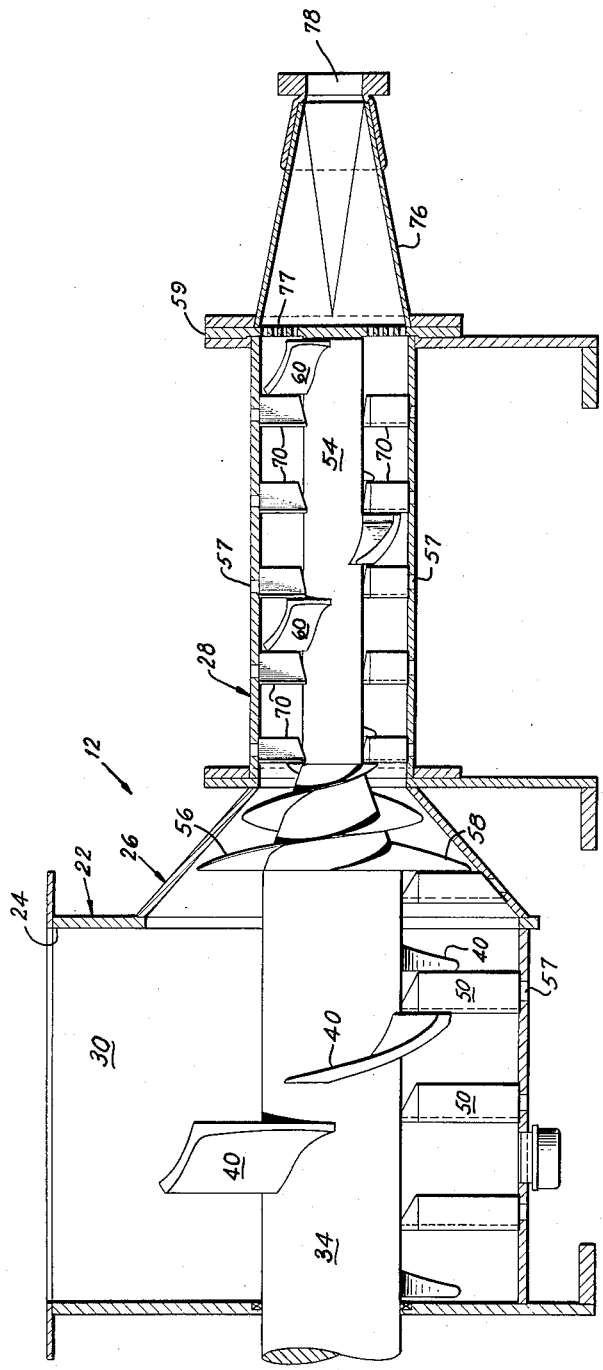

July 11, 1961 C. A. RIETZ 2,991,503
BREAKING, MIXING AND EXTRUSION APPARATUS
Filed Jan. 6, 1958 6 Sheets-Sheet 4
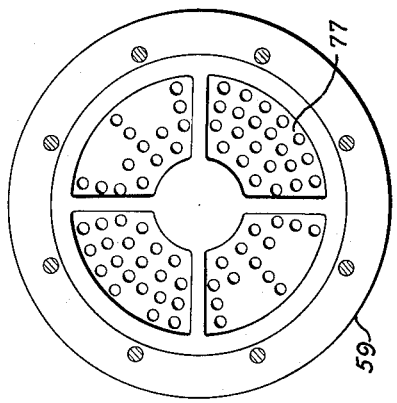
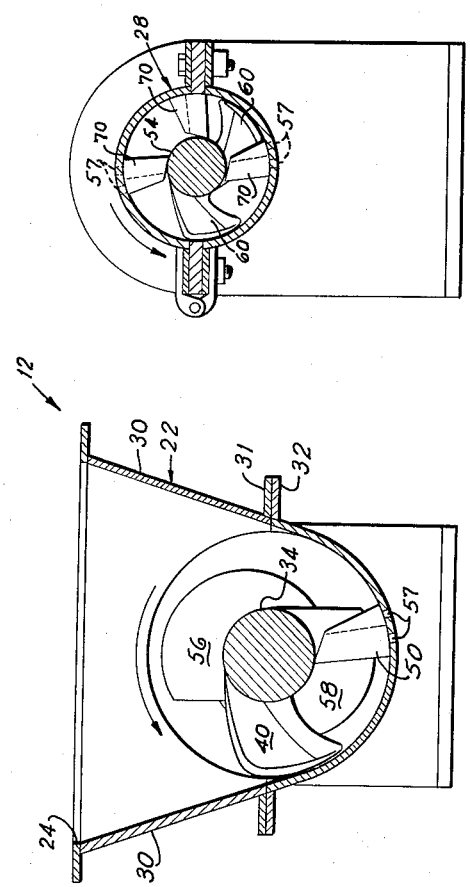
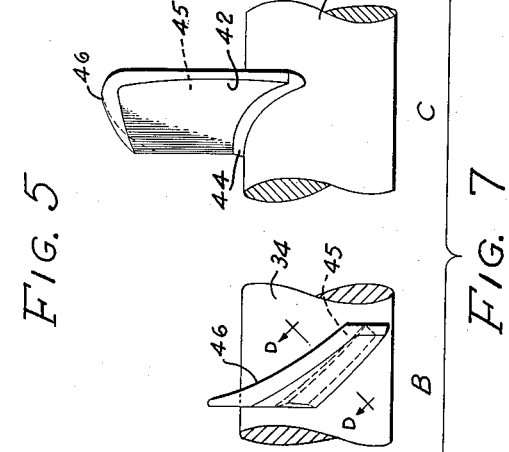
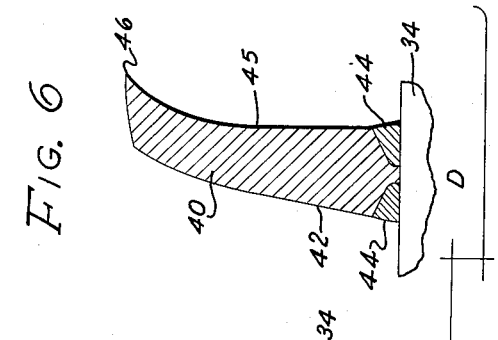
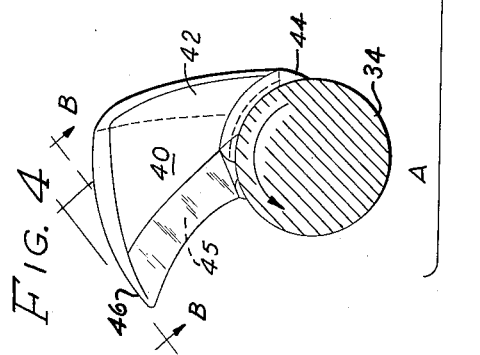
INVENTOR.
CARL A. RIETZ
BY
ATTORNEYS July 11, 1961  C. A. RIETZ  2,991,503
BREAKING, MIXING AND EXTRUSION APPARATUS
Filed Jan. 6, 1958  6 Sheets-Sheet 5
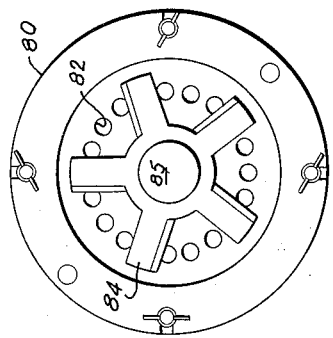
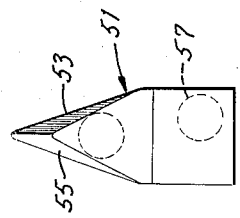
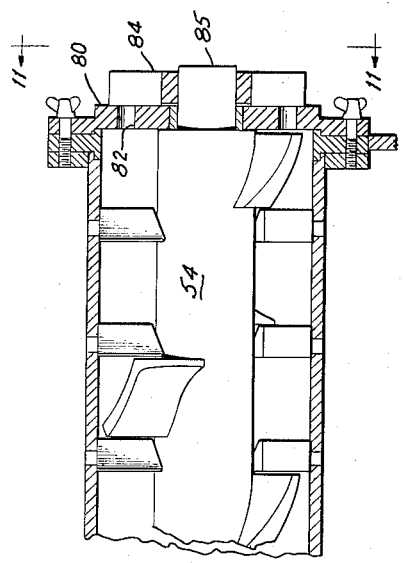
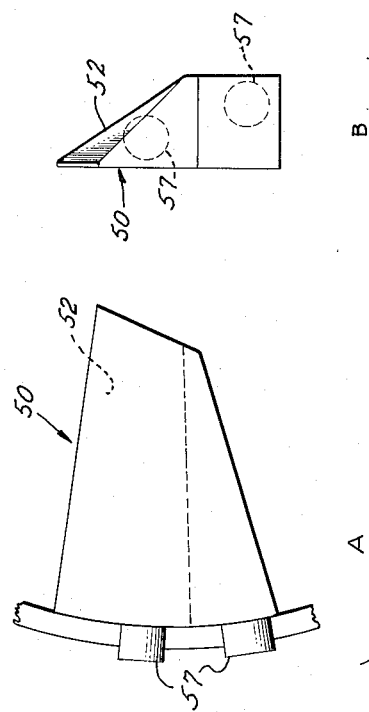
INVENTOR.
CARL A. RIETZ
BY
ATTORNEYS July 11, 1961

C. A. RIETZ 2,991,503

BREAKING, MIXING AND EXTRUSION APPARATUS

Filed Jan. 6, 1958

INVENTOR.
CARL A. RIETZ

BY

ATTORNEYS

United States Patent Office
2,991,503
Patented July 11, 1961

2,991,503
BREAKING, MIXING, AND EXTRUSION APPARATUS
Carl A. Rietz, San Francisco, Calif., assignor to Rietz Manufacturing Co., Santa Rosa, Calif., a corporation of California
Filed Jan. 6, 1958, Ser. No. 707,401
11 Claims. (Cl. 18—12)

This invention relates generally to machines for the mechanical disintegration, blending and extrusion of various materials. More particularly, it relates to machines of this character of the rotary crusher-mill type.

Disintegrating apparatus of the rotary crusher-mill type has been widely used, for example in the food processing industry, for disintegrating or reducing the particle fineness of various products. However, such apparatus has proved generally unsatisfactory for extrusion type processing, primarily because the crusher-mill action causes the formation of minute air pockets throughout the disintegrated material, tending to provide an extruded product of inferior quality. In addition, prior machines have been constructed in such manner as to form relatively dead spaces in which the disintegrated material itself can accumulate, and remain for a considerable time. These dead spaces not only detract from the extrusion potentials of the machine, but also raise the risk of possible bacterial contamination or spoilage where the material being handled is an item of food. Moreover, such machines are difficult to maintain in a clean and sanitary condition, because of the presence of the large bearings at either end of the machine mounting the rotary shaft. Upon terminating a run, it is difficult to remove material remaining within the machine and to clean and sterilize all of the working parts of the machine as required by sanitary regulations.

In general, it is an object of the present invention to provide a new type of disintegrating, blending and extrusion apparatus by which feed materials of a wide variety of types may be continuously and thoroughly disintegrated, blended to a plastic mass and extruded. Absolutely dry materials in block or granular form may be rapidly handled with machines of the invention with relatively small quantities of liquid for agglomerating.

Another object of the invention is to provide a novel form of extruding apparatus, particularly adapted for use in the food industry, and which will facilitate maintaining the working parts in clean and sanitary condition.

Another object of the invention is to provide a machine of the above character which is well adapted for high speed operation with almost any type of feed material to produce a pasty mass suitable for extrusion processing.

Additional objects of the invention will appear from the following description in which the preferred embodiments have been set forth in detail in conjunction with the accompanying drawing.

Referring to the drawing:

FIGURE 3 is a enlarged sectional view along the line 3—3 of FIGURE 2 illustrating the material handling portions of the machine of FIGURE 1;

FIGURE 4 is a cross-sectional view taken along the line 4—4 of FIGURE 2;

FIGURE 5 is a like view taken along the line 5—5 of FIGURE 2;

FIGURE 6 is a like view taken along the line 6—6 of FIGURE 2, and showing one form of an orifice discharge plate;

Figure 12:
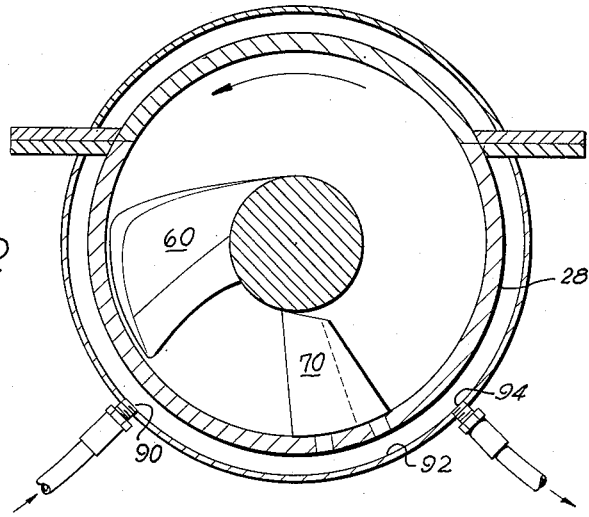
Figure 13:
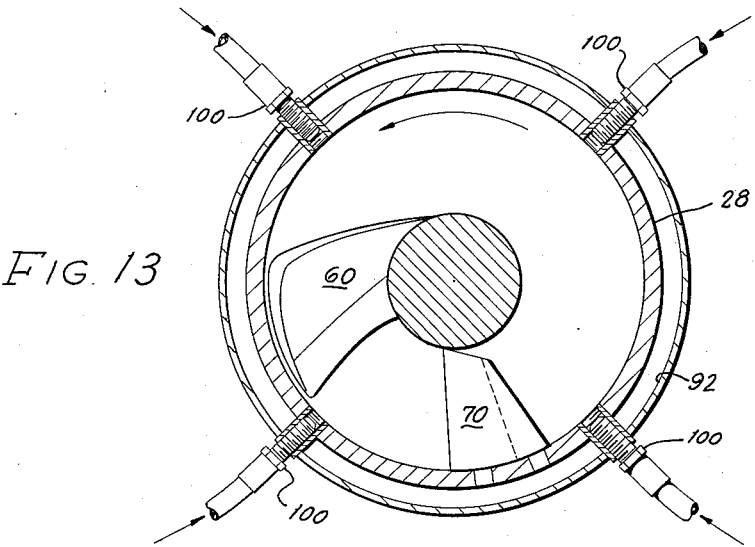

FIGURES 7A, B, C and D illustrate a typical construction of the novel disintegrating and blending arms;

FIGURES 8A and B are details illustrating construction of the deflecting anvils;

FIGURE 9 is a view like FIGURE 8B, showing a modified construction of the anvils;

FIGURE 10 is a cross-sectional detail of a modified device, showing a cut-off knife for use with a discharge orifice plate;

FIGURE 11 is an end elevation along the line 11—11 of FIGURE 10;

FIGURE 12 is a cross-sectional view like FIGURE 5, on an enlarged scale, illustrating a modified construction; and FIGURE 13 is a like view illustrating a further modification.

Figure 1:
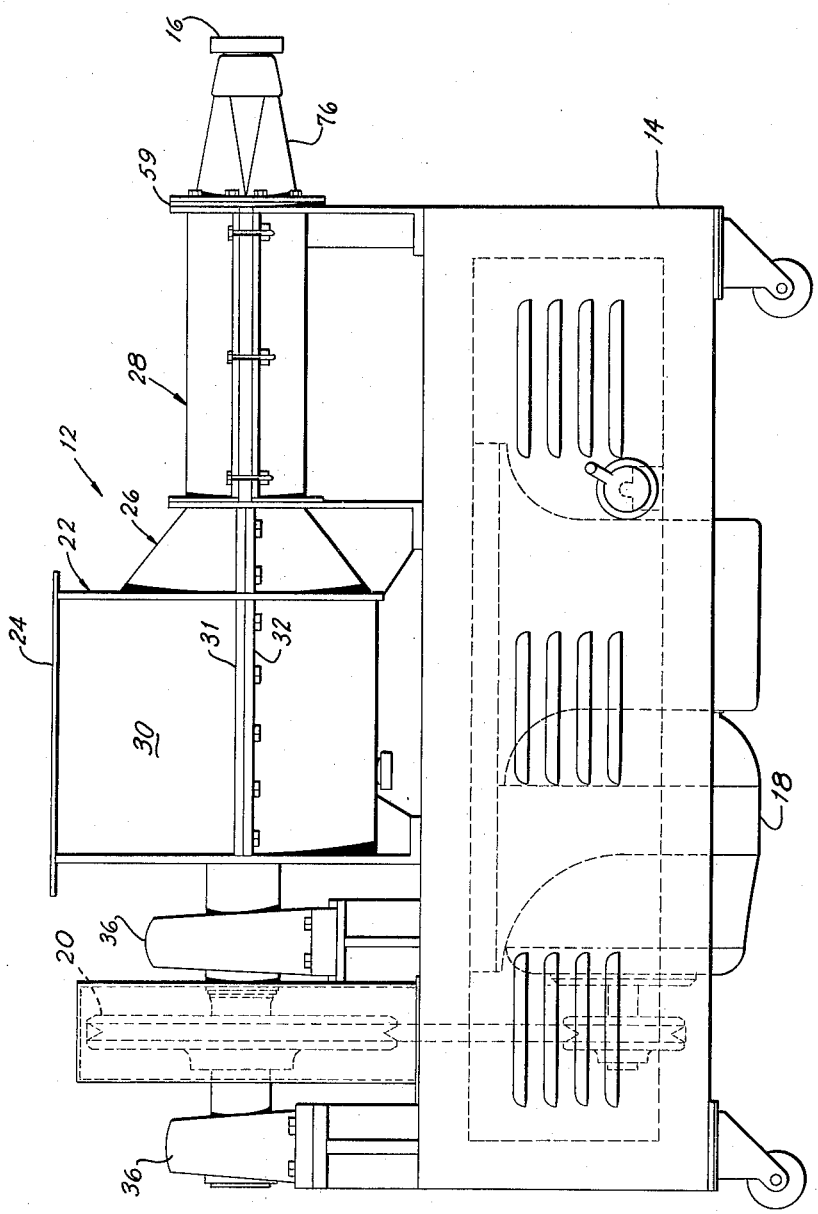
FIGURE 1 is a front elevational view of an easily transportable machine incorporating the present invention.
Figure 2:
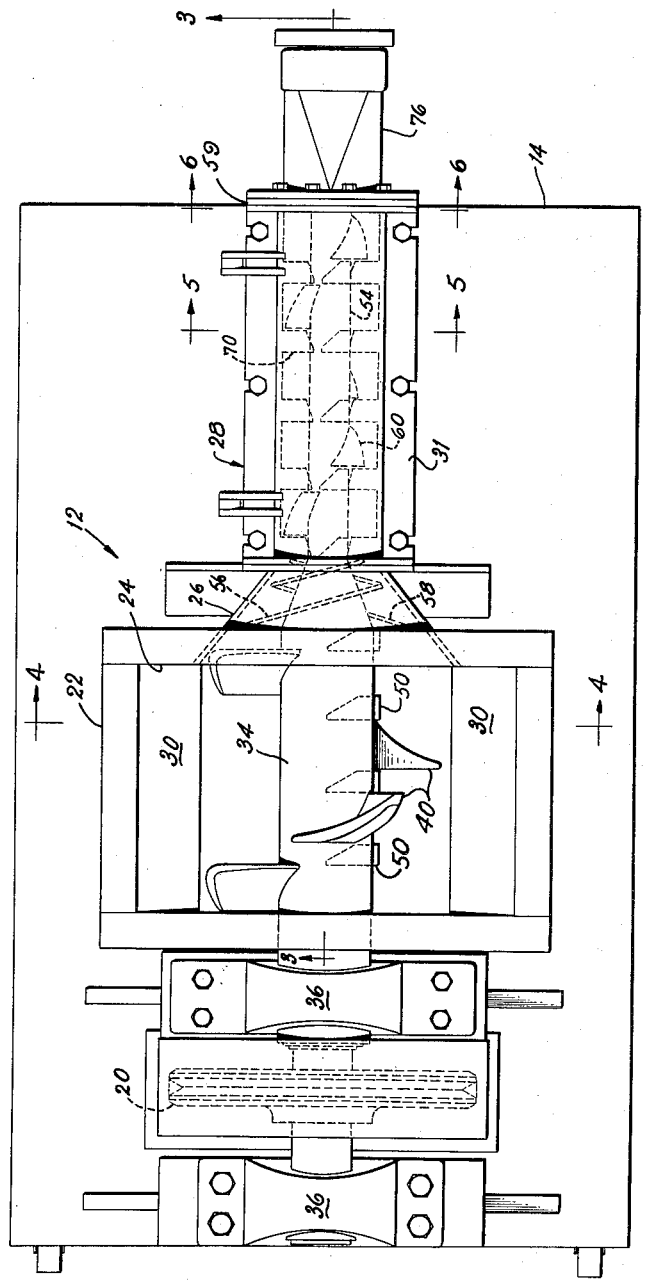
FIGURE 2 is a plan view illustrating the machine of FIGURE 1.

The machine as illustrated in FIGURES 1 and 2 of the drawing consists of a main material treating housing 12 which can advantageously be supported on a caster mounted truck unit 14. The machine has a single horizontal rotor or shaft provided with arms adapted to cause material fed to the housing to be disintegrated, mixed and extruded through a discharge opening at the end 16 of the machine. The truck frame 14 carries a suitable power driving source, such as the motor 18, adapted to drive the rotor by means of a power take-off 20.

The housing 12 comprises a hopper section 22 having an opening 24 for feed material, an intermediate frusto-conical section 26 and a cylindrical discharge section 28. The hopper section 24 may have upper, outwardly flaring wall portions 30 to facilitate the introduction of material to be treated. As illustrated, the housing can also consist of upper and lower welded sections which may be provided with cooperating side flanges 31 and 32 to facilitate clamping the two welded structures together.

The rotor consists of a shaft 34, one end of which is supported or journalled externally of the housing 12 by a pair of cylindrical bearings 36. The opposite or overhanging end of the shaft extends through the entire length of the housing 12, terminating at a free end 38 spaced slightly inwardly from the discharge end of the housing.

Mounted upon the shaft 34 within the hopper section of the housing are a plurality of breaker arms 40. As illustrated in detail in FIGURES 7A, B, C and D, the arms 40 can consist of vane-like members provided with thickened base portions 42 adapted to be integrally welded to the shaft, as at 44 (FIGURE 7D). As is particularly shown in FIGURES 7A and B, the structure of each arm is such that it curves generally in the direction of rotation of the shaft and forwardly toward the discharge opening of the housing, providing the material engaging face 45. Outer peripheral portions of the arms 40 terminate in a relatively sharp cutting or slicing edge 46 which facilitates the desired breaking and disintegrating action. The inclination or curvature with respect to the axis of the shaft of the thickened base portions 42 (FIGURE 7B) serves to positively urge the material being acted upon toward the discharge end of the housing.

As shown in FIGURE 3, each of the arms 40 is displaced axially from the zone of operation of the adjacent arm, and preferably is angularly displaced with respect to an adjacent arm by about 120°. The arms 40 serve not only to slice up and disintegrate the feed material and to push it forwardly into the housing sections 26 and 28, but also cooperate with stationary anvils mounted within the hopper section to provide an initial intensive mixing and blending of the feed material to achieve a paste-like consistency. This initial blending is essential to the subsequent extrusion processing, as will be presently explained.

Referring to FIGURES 8A and B, each of the anvils can be constructed as a rigid body 50 having a hardened impact face 52. Preferably, the face 52 of an anvil is inclined so that the treated material is urged both toward the discharge opening of the housing and outward into the path of a rotating arm 40. In the apparatus illustrated in FIGURES 1–8, the face 52 is inclined for these purposes at an angle of about 25° relative to the shaft axis, although the angle can advantageously be varied between about 15° to 45°. In certain operations, however, it may be desirable to employ an anvil construction providing a more intensive preliminary mixing in the hopper section 22. FIGURE 9 illustrates such a modified anvil construction 51 in which only the forward face 53 urges the material forwardly in the housing, whereas the rear face 55 serves to resist such forward movement. Desirably, each of the anvil constructions is provided with protruding legs or welding stubs 57 adapting the anvils to be rigidly attached within the wall of the housing 12.

The broken, disintegrated and partially mixed feed material is conveyed by the rotating arms 40 and anvils 50 into the conical transition section 26. There the material is acted upon by a double flight screw of reducing diameter comprising the pair of helical blade members 56 and 58. The effect of the screw is to convey the feed material from the larger hopper section 22 into the small diameter blending and extrusion section 28, while simultaneously mulling and compressing the material to produce a desired dense consistency for the subsequent blending and extrusion operations in section 28.

It will be understood that a substantially paste-like consistency is necessary before the feed material will convey up the inclined lower surface of the conical section 26. The conical transition section is therefore particularly important to the extrusion processing since it insures a desired preliminary mixing in the hopper section prior to movement into the blending and extrusion section 28. For example, when mixing a dry powder with a liquid to form an extrudable paste, putty, etc., neither the dry powdered material nor the liquid will individually convey up the incline 26, the initial mixing in the hopper 22 being essential to form a preliminary crude paste.

Within the section 28, the dense paste-like feed material is subjected to an intense kneading and mulling action, providing a desired thorough blending prior to extrusion through the discharge orifice plate 59. For this purpose, the shaft 54 is provided with a plurality of mixing and kneading arms 60 similar in construction to the breaker arms 40. However, because of the smaller diameter of the extrusion section 28, the arms 60 are of substantially less diameter and of slightly less axial dimension than the arms 40, as is clearly illustrated in FIGURES 3 and 5.

In order to secure the desired mixing and mulling action, it is desirable to provide several rows of stationary anvils 70. In the illustrated apparatus; four longitudinal rows of anvils 70 are provided, displaced at 90° from one another. The anvils 70 are similar in construction to the anvils 50 but are of less radial and axial dimension as illustrated, for example, in FIGURES 3 and 5. The impact faces 72 of the anvils can be as illustrated in either FIGURE 8 or 9, but preferably are inclined only toward the discharge end of the extrusion section, and cooperate with the rotating arms 60 to force the material to be extruded against the discharge orifice plate with considerable force.

It will be understood that the paste-like feed material passing into the extrusion section 28 is forced by the rotating blade portions of the arms 60 into contact with successive radial groups of the stationary anvils 70. As an arm 60 passes a group of anvils, a portion of the paste-like material is moved forward by the inclined surfaces of the arm and anvil faces 45 and 72, and a portion remains behind. The presence of the anvils prevents the material from rotating with the arms 60. Progressively, new material is forced past the groups of anvils and toward the discharge opening. The combined effect of the arms 60 and anvils 70 is therefore to provide a continuous kneading and mulling and mixing action, forcing the feed material against the discharge orifice plate 59.

Various discharge orifice plates and extrusion dies may be installed at the discharge end of the extrusion section 28 to vary both the mixing action within the section and the type of extruded product. In the apparatus illustrated in FIGURES 1–6, the discharge orifice plate is of a screen type particularly adapted for use with an extrusion head such as the head 76. The screen plate 59 is provided with a plurality of perforated screen sections 77, the size of which determine the degree of mixing and mulling in the extrusion section 28. The screen plate also provides a certain amount of blending of the material extruded through the perforations of the screen sections, and provides a final de-lumping and blending action. The material forced through the screen plate is compressed and shaped by the tapered head 76 and is finally extruded through the discharge orifice 78. If desired, a heater unit may be provided immediately before the extrusion outlet 78 to insure a desired plasticity for the final extrusion to achieve a desired shape for packaging.

The operation of the machine described above is as follows: assuming, for example, the production of a packaged cheese blend, moist solid blocks of previously processed cheese are introduced into the hopper section 22 along with quantities of liquid as necessary for agglomerating and producing a desired plastic mass. The shaft 34 is driven at a suitable rate of speed depending upon the material being handled. The material introduced into the hopper is quickly broken up by the breaker arms 40. As the material is further disintegrated and mixed with the liquid, it is forced by the breaker arms 40 and by the flight of anvils 50 toward the right as viewed in FIGURES 1 and 2, and into the conical transition section 26 of the housing. The double flight of screw conveyors 56 and 58 forces the material into the smaller diameter extrusion section 28, simultaneously compressing and mulling the partially mixed material. The compacted feed material forced into the extrusion section is now acted upon by the smaller diameter mixing arms 60 which cooperate with the flights of anvils 70 to provide a continuous kneading, mulling and mixing action upon the feed material. Depending upon the intially density of the feed material, the continuous action in the extrusion section produces a thoroughly mixed extrusion mass which may be of a relatively heavy plastic-like consistency. This extrusion mass can be forced through a discharge orifice plate of the screen type, as illustrated, to provide a final blending and conditioning of the product prior to extrusion through the heated discharge orifice 78.

The apparatus illustrated in FIGURES 1 to 6 can be widely applied to the continuous mixing of ingredients to provide an extrudable paste or plastic mass for continuous extrusion processing. It can be used as illustrated, or with slight modifications, to process feed materials ranging from solid blocks of substantial size to dry powders, and in a wide variety of breaking, mixing and extruding operations. The apparatus has been very successfully employed, for example, in the mixing of dry materials with liquids to form pellets or strings of material having desired properties. One such modification is shown in FIGURES 10 and 11 where an orifice plate 80 is shown provided with a single annular row of holes 82. This type plate has been particularly useful, for example, in the preparation of dog food pellets, the dry ingredients of the dog food such as ground cereal, dried ground meat, dried bone, etc. being continuously mixed into an extrudable mass and forced through the holes 82 as continuous strings. An external multi-bladed cut-off knife 84 mounted on the end of the shaft 85, and outside of the orifice plate, acts to cut off the extruded ends of the strings at a desired length. The extrusions can then be dried in ovens to remove moisture and to produce the end product. Similar modifications can be adapted in the preparation of tableting from granulated pharmaceutical materials, in the extrusion of gelatins and glue gels for drying, in the mixing of powders and liquid carriers for the production of adhesives, etc.

Apparatus in accordance with the invention has also proved particularly adaptable to the mixing and blending of semi-solid materials to process relatively heavy plastic-like doughs, putty, resinous compositions and the like into an extrudable form. For example, the apparatus has been used with considerable success in the high speed handling of heavy plastic bitumastic compounds, as in the de-lumping and smoothing of asphaltic roofing compounds directly ahead of packaging. Other typical applications include the mulling, mixing and extruding of waste soap, the mixing of resins with cork, to provide an extruded product, etc.

In addition, the extrusion section 28 can be jacketed for heating or cooling as may be required by the material being processed. FIGURE 12 illustrates a modified jacketed construction for the discharge section 28 by which a cooling or heating medium can be introduced through the inlets 90 into the space 92 about the section and then discharged through the outlets 94. Such a construction for cooling purposes might be of particular use where intensive mulling and blending without any undue build-up of heat was desired.

FIGURE 13 illustrates a particular modification by which the injection of steam into the extrusion section is made possible, for example in the processing of wood chips into a pulp. Thus the chips can be fed into the hopper of the machine along with a chemical such as caustic soda, and steam injected through the nozzles 100 directly into the extrusion section 28 to effect the pulping. The chips are heated by the steam and the chemical forced into the wood particles, with a consequent softening and loosening of the fibers. At the same time, the rotating arms 60 and the anvils 70 mull and rub the chips to provide a desired separation and pulping action for paper making.

To those skilled in the art to which this invention relates, many additional changes in construction and widely differing embodiments and applications of the invention will suggest themselves without departing from the spirit and scope of the invention. For example, in the processing of certain materials, a slight forward curvature of the walls 26 of the compression section has proved to be of advantage in causing a desired blending and extrusion of the charged ingredients. Accordingly, it should be understood that the disclosures and description herein are purely illustrative and are not intended to be in any sense limiting.

I claim:

1. A machine for carrying out simultaneous disintegrating mixing, blending and extruding operations, comprising: a housing having a hopper for receiving and disintegrating feed material, an intermediate compression section, and a cylindrical blending and extruding section, said extruding section having a discharge end provided with means for extruding feed material; journal means mounted exteriorly of said hopper section; a rotatable horizontal shaft mounted by said exterior journal means so as to extend through the housing, said shaft terminating at one end thereof adjacent the discharge end of the housing; a plurality of individual vane-like breaking, mixing and kneading arms mounted on said shaft, said arms being inclined with respect to the axis of the shaft so as to urge feed material toward said discharge end; and a plurality of spaced stationary anvils mounted within the housing and extending radially inward between the paths of movement of said mixing arms and including inner anvil portions lying between the outer extremities of said mixing arms, said intermediate housing section including a wall portion of uniformly reducing diameter and adapted to produce a progressive intensive mulling and compression of disintegrated feed material passing directly therefrom into said cylindrical blending and extruding section, said cylindrical blending and extruding section of said housing being of uniformly smaller cross-section than the hopper section of said housing, whereby material fed to said hopper will be subjected to a progressive intensive breaking, mixing, mulling kneading and action and extruded in desired form through said discharge end of the housing.

2. A machine as in claim 1 in which said intermediate housing section is of substantially frusto-conical configuration.

3. A machine as in claim 1 in which said means for extruding feed material comprises an orifice plate positioned within a discharge opening in the discharge end of said housing.

4. A machine as in claim 3 in which a cut-off knife is provided on said rotatable shaft, said cut-off knife being positioned immediately adjacent but exterior to said discharge plate.

5. A machine as in claim 1 in which said means for extruding feed material comprises an extrusion head of reducing diameter and terminating in an extrusion outlet of desired configuration.

6. A machine as in claim 1 in which said mixing and kneading arms are in the form of hooked blades curving both in the direction of rotation and toward said discharge opening, outer peripheral portions of said blades terminating in relatively sharp cutting and slicing edges, such blades effecting a rapid disintegration, mixing and forward compression of feed material.

7. The machine of claim 6 in which said blades are formed integrally with said rotatable shaft.

8. A machine as in claim 1 in which said stationary anvils are also inclined with respect to the axis of the rotatable shaft so as to urge feed material toward the discharge end of the housing.

9. In a disintegrating, mixing, blending and extruding machine: a housing having a hopper for receiving and disintegrating feed material, an intermediate compression section, and a cylindrical blending and extruding section having an end orifice plate for discharge of extruded material; a pair of spaced cylindrical bearings mounted externally of said hopper section; a rotatable horizontal shaft journalled in said bearings so as to extend through the housing, said shaft terminating at one end thereof adjacent to said discharge orifice plate; a plurality of individual vane-like mixing and kneading arms mounted on said shaft and angularly displaced with respect to each other and integral with said shaft, each arm including a thickened web portion inclined with respect to the axis of the shaft and a hooked forwardly curved blade-like member with a sharpened cutting edge, said arms being adapted to simultaneously slice into the material being treated and to urge it positively toward said discharge orifice plate; and a plurality of spaced stationary anvils mounted within the housing and extending radially inward between the paths of movement of said mixing arms, said anvils being provided with impact faces likewise inclined in a direction to urge feed material toward said discharge orifice plate, said intermediate housing section including a substantially frustoconical wall portion adapted to produce a progressive intensive mulling and compression of disintegrated feed material passing directly therefrom into said blending and extruding section, said blending and extruding section of said housing being of uniformly smaller cross-section than the hopper section of said housing, whereby material fed to said machine will be subjected to a progressive mixing and intensive mulling and kneading action causing it to pass in extruded form through said discharge orifice plate.

10. A machine as in claim 9 in which said cylindrical blending and extruding section is jacketed to provide heating and cooling of the material being extruded, as desired.

11. A machine as in claim 9 in which said cylindrical blending and extruding section is provided with means for directing fluids under pressure directly into said section, as may be necessary in the extrusion processing.

References Cited in the file of this patent

UNITED STATES PATENTS

| | | |
|---|---|---|
| 474,561 | Maxim | May 10, 1892 |
| 1,017,286 | Du Pont | Feb. 13, 1912 |
| 1,577,336 | Marsden | Mar. 16, 1926 |
| 1,964,266 | McElroy et al. | June 26, 1934 |
| 2,011,055 | Klugh | Aug. 13, 1935 |
| 2,091,293 | Steuermann | Aug. 31, 1937 |
| 2,401,236 | Fielitz | May 28, 1946 |
| 2,434,690 | Ferla | Jan. 20, 1948 |
| 2,640,033 | Marshall | May 26, 1953 |
| 2,738,932 | Rietz | Mar. 20, 1956 |
| 2,783,498 | Richardson | Mar. 5, 1957 |